Sept. 25, 1962 — E. COWLES ETAL — 3,055,599
PEPPER MILLS
Filed Nov. 9, 1959
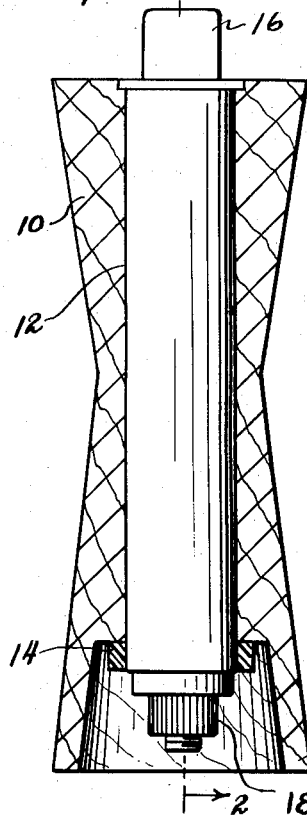
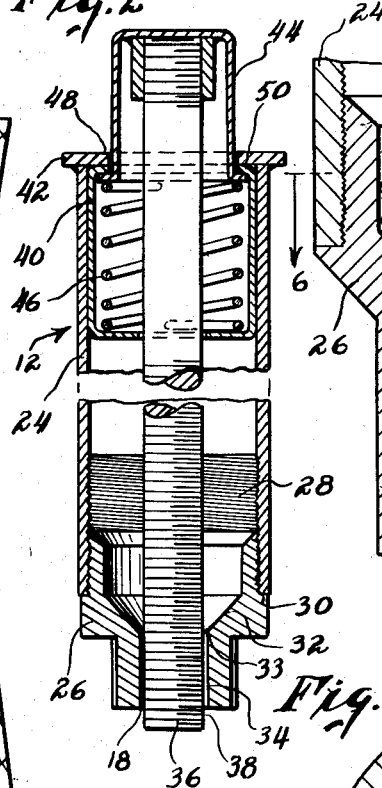
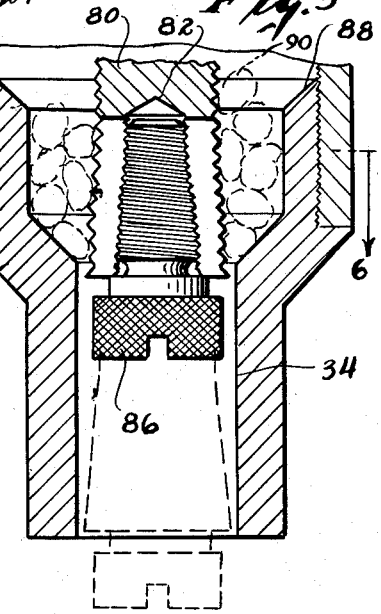
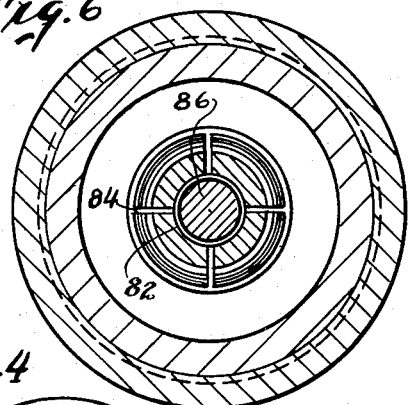
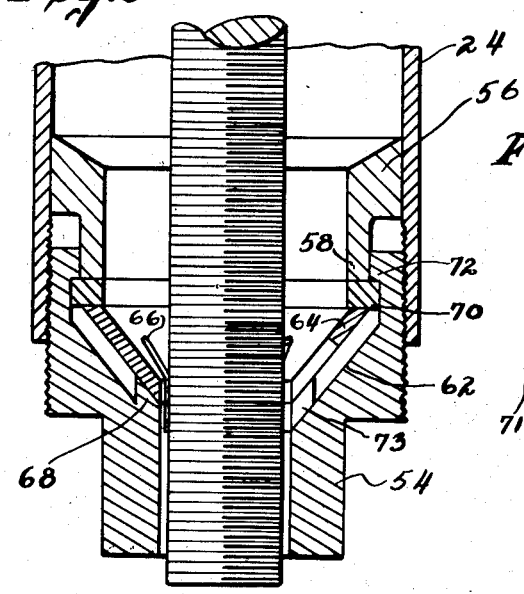
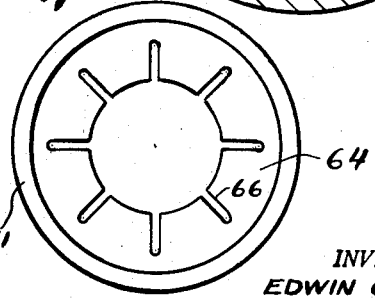
INVENTORS
EDWIN COWLES
KENNETH H. BOWEN
BY
ATTORNEYS

# United States Patent Office 3,055,599
Patented Sept. 25, 1962

3,055,599
PEPPER MILLS
Edwin Cowles, New York, and Kenneth H. Bowen, Auburn, N.Y., assignors, by mesne assignments, of one-half to said Edwin Cowles, and one-half to Catherine B. Cowles.
Filed Nov. 9, 1959, Ser. No. 851,824
6 Claims. (Cl. 241—169)

This invention relates to pepper mills and, more particularly, to a pepper mill cartridge adapted for use with a plurality of enclosing bodies.

Small, manually operated pepper mills in which whole pepper corns may be ground and the freshly ground pepper distributed onto food are known to the art. The most common pepper mill of this type is held by one hand while the other hand rotates a crank to grind the pepper. However, such mills require both hands for operation thereof. It is desirable that the pepper mill be capable of operation while held in only one hand. Exemplary of such pepper mills is the mill set forth in application Serial No. 733,628 filed May 7, 1958 which application has been abandoned.

The disclosed pepper mill and those others known to the art suffer from the disadvantage that it is difficult for the users to fill the mill with pepper corns. For example, it is often necessary to remove a cover and insert pepper corns in the mill body while blocking the normal exit to prevent discharge of pepper and the pepper corns therefrom. Such difficulties inhibit the widespread use of the mills.

Further, the mills known to the art have provided merely a fixed fineness of grind. Adjustability of the grind is necessary to satisfy the needs of the many potential purchasers.

Additionally, the pepper mills known to the art have used a hollowed-out body as the chamber for the pepper corns. Thus, only a few body styles are economically produced by a manufacturer, and the style variations necessary to satisfy the potential purchasers have not been available.

It is therefore one object of this invention to provide a pepper mill cartridge which can be fabricated in a single predetermined form and mounted within a plurality of differently styled bodies.

It is a further object of this invention to provide a pepper mill cartridge in which the fineness of grind may be adjusted by the user.

It is a further object of this invention to provide a pepper mill cartridge which may be conveniently loaded with pepper corns.

Other objects and advantages of the invention will appear hereinafter.

In accordance with these objects there is provided, in a preferred embodiment of this invention, a pepper mill cartridge comprising an elongated cylindrical case. At one end thereof there is provided a hollow annular cap having an internal, conically tapered surface, the edge of which defines an aperture therethrough coincident with the axis of the casing. An axially extending spindle is provided which extends coincident with the casing axis and through the aperture in the end cap. The spindle is provided with serrations thereon along the surface adjacent the aperture to grind the pepper corns therebetween.

At the other end of the casing, there is provided a closure cap. An operating plunger is telescopically mounted within the cap and is spring biased to an extended position by a spring contained within the cap. The plunger is operably connected to the spindle, and the plunger and spindle are reciprocatable under finger pressure, along the axis of the casing to provide a grinding action on the pepper corns.

In another embodiment of this invention the grinding cap is provided with a deformable, conical insert member in frictional engagement at the outer edge thereof with a shoulder formed annularly within the casing and at the inner surface thereof with an annular support extending upwardly from the end cap. Adjustment in the insertion distance of the end cap will thereby controllably deform the conical insert to vary the distance between the inner edge thereof and the spindle extending therethrough to adjust the fineness of the grind of the pepper corns during reciprocation of the spindle.

In a still further embodiment of this invention the spindle extending through the end cap is split axially and is provided with an axial bore. A tapered plug threadably inserted within the bore can be controllably inserted to increase the diameter of the spindle at the portion opposite the grinding surface of the end cone thereby to vary the fineness of the grind of the pepper corn as desired by the user.

In each of said embodiments the pepper mill may be fabricated by inserting the cartridge within a body suitable for the application intended to thereby provide a plurality of pepper mill styles with a single operating pepper mill cartridge.

The invention may be more easily understood by reference to the following specification taken in conjunction with the accompanying drawings of which:

FIGURE 1 is a partially sectioned view of a pepper mill fabricated in accordance with this invention.

FIGURE 2 is a cross sectioned view of the cartridge employed in the pepper mill shown in FIGURE 1 taken along lines 2—2 of FIGURE 1.

FIGURE 3 is a sectioned view of a portion of the cartridge in accordance with another embodiment of this invention.

FIGURE 4 is a plan view of the insert shown in FIGURE 3.

FIGURE 5 is a sectioned view of a portion of the cartridge in accordance with a still further embodiment of this invention, and FIGURE 6 is a sectioned view taken along lines 6—6 of FIGURE 5.

Referring to FIGURE 1, there is shown a pepper mill comprising a body 10 within which is mounted a pepper mill cartridge 12. The body 10 may be formed of materials suitable for the application intended such as a wooden body having a central bore to receive the pepper mill cartridge. An annular ring 14 is secured concentric with the bore and is dimensioned with an internal dimension suitable to engage the cartridge in a press-fit therewith to secure the cartridge within the bore of the pepper mill body.

The pepper mill is provided with an operating plunger 16 which may be depressed for example by the thumb while holding the pepper mill in one hand, and is provided with an end cap 18 having an exit aperture from which the ground pepper emerges, as for dispensing upon food. The end cap is provided with a knurled surface so that the end cap may be easily grasped for removal during loading of the pepper mill with pepper corns. It has been found desirable to provide the body with a flange 22 both to allow the pepper mill to stand erect upon a planar surface and to provide a funnel-shaped arrangement to aid in loading of the pepper corns into the cartridge. The cartridge is best shown in FIGURE 2.

In FIGURE 2 there is shown the pepper mill cartridge 12. The cartridge comprises an elongated cylindrical casing 24 having a hollow annular end cap 26 removably inserted therein.

The end cap is a hollow annular cap which can be removably inserted in the end cylindrical casing as for example by the co-action of external threads thereon with internal threads 28 in the casing wall. A shoulder 30 may be provided to locate the desired depth of cap insertion within the casing.

The cap comprises a conical wall 32 inclined outwardly at an acute angle to the axis of the casing. The edge 33 of the wall defines a cylindrical aperture 34 extending through the cap coincident with the axis of the casing. The aperture is spaced apart from the spindle 36 to provide an annular exit 18 for flow of ground pepper therethrough.

The angle of inclination of the wall 32 may vary somewhat but if too small the pepper corns may become jammed against the reciprocating grinding element hereinafter described and if too large the grinding may become ineffective. For best results, an angle of inclination between 40 and 50 degrees has been found advantageous.

The grinding element comprises a spindle 36 mounted co-axially within the casing. The portion of the spindle which is opposed to the tapered surface 32 is provided with a serrated surface 38 which forms a grinding surface cooperating with the tapered surface 32 and the edge 33 to grind the pepper corns when the spindle is reciprocated as hereinafter described.

In the embodiment illustrated, the serrated surface 38 is formed by cutting an ordinary helical screw thread in the spindle with the teeth spaced $\frac{1}{32}$ inch apart. It has been found that screw threads of 20 to 32 threads per inch have been satisfactory. It will be noted that other forms of serrated surfaces may be used.

The other end of the casing is closed by a cup 40 which is pressed into the casing with a press fit until the shoulder 42 thereof contacts the top of the casing wall. In addition to, or alternatively, the cup may be located by an internal shoulder in the casing wall. An operating plunger 44 is mounted in telescopic relationship to cup 40. A spring 46 biases the plunger to the outward or retracted position, defined by the co-action of flange 48 with the lip 50 of the cup. The spindle 36 extends through the cup and is operably coupled to the plunger by the threaded engagement of the spindle with the threaded cup 52 affixed to the operating plunger 44.

In operation the mill may be loaded with pepper corns merely by unscrewing the cap 26 to permit insertion of the pepper corns. Thereafter the cap is again screwed onto the casing readying the cartridge for operation. The cartridge (or the body of the pepper mill in which the cartridge is inserted) may be grasped in the fingers of one hand and the plunger depressed repeatedly by the thumb to grind the pepper corns. After each depression of the plunger, the plunger and the spindle is returned to the retracted position through return spring 46.

In many applications it is desirable to provide means for the user of the mill to adjust the fineness of the grind to the individual taste thereof. In such applications the embodiment shown in FIGURES 3 and 4 may advantageously be employed.

In FIGURES 3 and 4 there is shown a cartridge comprising the case 24 and an end cap 54 removably inserted into the end of the casing. As with the embodiment shown in FIGURE 2, the cap 54 may be removably inserted through co-action of external threads with internal threads in the casing 24. The casing is provided with an annular member 56 providing an annular shoulder 58 and an axially extending aperture between the shoulder and the casing wall. The member 56 is pressed into casing 24 with a press fit and is frictionally held in position.

The cap is provided with a conical surface 62 formed at an acute angle to the axis of the casing. A conically shaped deformable insert 64 is provided which is carried by cap 54. The conical surface may preferably comprise a cone-shaped member provided with radially extending slits 66. The deformable cone is supported by the annular space block 68 on the cap 54 and held to the end cap by the snap ring 70 inserted between the annular flange 71 on the insert and the shoulder 72 on the cap.

In operation, the cap is inserted within the casing. As the insertion distance is increased as for example by continued rotation of the cap and co-action of the mounting threads with the casing threads, the shoulder 58 will bear on the top surface of the snap ring 70 applying pressure to the entire outer periphery of the deformable cone. The bearing ring 68 will similarly apply pressure to the inner peripheral edge of the cone. These forces will deform the cone decreasing the distance between the annular aperture therein and the spindle 38 extending therethrough. Variation in this distance will of course vary the fineness of the grind since the distance between the edge of the cone-shaped member and the serrated surface of the spindle similarly changes.

When the cone-shaped member is provided with radially extending slots 66 to augment the deformability thereof, it will be noted that the ground pepper will pass into the space between the cap and the cone-shaped member. To prevent packing of the ground pepper behind the conical insert, the annular spacer block must be provided with radially extending slits 73 to allow the pepper to pass therethrough.

It will be noted that the operation of the cartridge shown in FIGURE 3 is identical to that shown in FIGURE 2 both in loading and in use in a pepper mill.

In some applications it has been found desirable to provide a grind adjustment by change of the diameter of the spindle. In such applications, the embodiment shown in FIGURES 5 and 6 may advantageously be employed.

In FIGURES 5 and 6 there is shown the casing 24 and an end cap 26 removably inserted therein. The end cap is annular to that shown in FIGURE 2.

The spindle 80 is provided with an internal bore 82 the walls of which are split by radially extending slots 84. A plug 86 is provided which is threadably inserted within the bore to expand the walls in accordance with the distance of insertion thereof. The plug may be screwed in to expand the walls to give the desired fineness of grind. In this embodiment, it will be noted that since the smallest clearance is between the end threads 88 and the walls that some grinding will take place in the circular aperture defined by wall 34. It will also be noted that some grinding will occur between the spindle and the conical wall 88 due to bridging between the wall and the spindle by the pepper corns 90. Grinding along the length of the spindle is often advantageous.

While the mill has been described with particular reference to pepper corns, it will be apparent that the mill may be used to grind other condiments.

This invention may be variously modified and embodied within the scope of the subjoined claims.

What is claimed is:

1. A grinding mill cartridge for use with a selected one of a plurality of grinder bodies having a cylindrical aperture therein comprising a cylindrical casing to be received in a cylindrical aperture in said grinder body, means associated with said casing to secure the cartridge within the grinder body, a hollow annular end cap removably inserted within one end of said casing, said end cap having an internal conical surface, said surface forming an acute angle to the longitudinal axis of said casing, said conical surface terminating in an edge defining an aperture concentric with the longitudinal axis of the casing, a spindle extending through said casing and through said aperture, the portion of said spindle which is opposed to said tapered surfaces having a serrated surface, and means to reciprocate said spindle axially of said casing, said means comprising an operating plunger mounted in the other end of said casing and operably connected to said spindle.

2. A grinding mill cartridge in accordance with claim 1 which includes means for adjusting the annular space between said spindle and said edge.

3. A grinding mill cartridge in accordance with claim 2 in which said spindle is provided with an axially extending bore in the grinding end thereof and in which the walls enclosing said bore are split axially, and which includes a plug insertable with said bore, said plug having a tapered surface so that the spindle will be expanded as said plug is inserted within the bore.

4. A grinding mill comprising a body and a grinding mill cartridge inserted therein, said cartridge being provided at one end thereof with an end cap removably mounted in said cartridge, said end cap having an internal conical surface terminating in an edge defining an aperture extending therethrough, a spindle extending through said cartridge and through said aperture, the portion of said spindle which is opposed to said conical surface having a serrated surface, said body defining a flange flared from said end cap to funnel pepper corns into said cartridge when said end cap is removed, and means to reciprocate said spindle within said aperture thereby to grind pepper corns between said spindle and said edge.

5. A grinding mill comprising a body and a grinding mill cartridge inserted therein, said cartridge being provided at one end thereof with an end cap removably mounted in said cartridge, said end cap having an internal conical surface terminating in an edge defining an aperture extending therethrough, a spindle extending through said cartridge and through said aperture, the portion of said spindle which is opposed to said conical surface having a serrated surface, said body defining a flange flared from said end cap to funnel pepper corns into said cartridge when said end cap is removed, means to reciprocate said spindle within said aperture thereby to grind pepper corns between said spindle and said edge and means for adjusting the annular space between said spindle and said edge, said adjusting means comprising a conical deformable surface with a central aperture, and an annular support extending between the edge of said surface defining said aperture and the edge of said aperture defining conical surface of said cap, an annular shoulder mounted within said casing and adapted to bear on the outer edge of said deformable surface when said annular cap is inserted within said casing, and means to adjust the insertion distance of said cap.

6. A grinding mill comprising a cylindrical casing, a hollow annular end cap removably inserted within one end of said casing, said end cap having an internal conical surface, said surface forming an acute angle to the longitudinal axis of said casing, said conical surface terminating in an edge defining an aperture concentric with the longitudinal axis of the casing, a spindle extending through said casing and through said aperture, the portion of said spindle which is opposed to said tapered surfaces having a serrated surface, means to reciprocate said spindle axially of said casing, said last named means comprising an operating plunger mounted in the other end of said casing and operatably connected to said spindle, and means for adjusting the annular space between said spindle and said edge, said adjusting means comprising a conical deformable surface with a central aperture, an annular support extending between the edge of said surface defining said aperture and the edge of said aperture defining conical surface on said cap, an annular shoulder mounted within said casing and adapted to bear on the outer edge of said deformable surface when said annular cap is inserted within said casing, and means to adjust the insertion distance of said cap.

References Cited in the file of this patent

UNITED STATES PATENTS

| | | |
|---|---|---|
| 1,208,099 | Cornell | Dec. 12, 1916 |
| 1,366,929 | Pesnik | Feb. 1, 1921 |
| 1,491,529 | Haeseler | Apr. 22, 1924 |
| 1,965,919 | Bieger | July 10, 1934 |
| 2,876,956 | Bentley | May 10, 1959 |

FOREIGN PATENTS

| | | |
|---|---|---|
| 804,555 | France | Aug. 3, 1936 |